United States Patent [19]

Thomas

[11] 4,369,813

[45] Jan. 25, 1983

[54] PIPE STOPPER METHOD AND APPARATUS

[75] Inventor: John H. Thomas, Pittsburgh, Pa.

[73] Assignee: Kerotest Manufacturing Corp., Pittsburgh, Pa.

[21] Appl. No.: 228,579

[22] Filed: Jan. 26, 1981

[51] Int. Cl.³ .................... F16L 55/10; F16L 55/12
[52] U.S. Cl. ........................................ 138/94; 138/89
[58] Field of Search .................... 138/89, 92, 93, 94

[56] References Cited

U.S. PATENT DOCUMENTS

| | | | |
|---|---|---|---|
| 2,141,274 | 12/1938 | Lenhart | 138/89 |
| 2,476,907 | 7/1949 | Preston et al. | 138/94 |
| 2,937,666 | 5/1960 | Maisch | 138/89 |
| 3,451,583 | 6/1969 | Lee | 138/89 |

Primary Examiner—John W. Shepperd
Attorney, Agent, or Firm—Stanley J. Price, Jr.; John M. Adams

[57] ABSTRACT

A hollow tubular body is welded to a distribution pipeline in surrounding relation with a cut-out portion of the pipeline. A plug assembly is inserted through an opened gate valve attached to the tubular body and into engagement with the tubular body. The gate valve is removed and an operator device is attached to the plug assembly. The plug assembly includes an expandable portion and an insert portion. The expandable portion includes an enlarged first chamber and a reduced second chamber. A plug assembly guide is positioned between the expandable portion and the insert portion. A nonrising actuating stem is rotated to nonrotatably move the plug assembly guide to advance the expandable portion through the tubular body and the cut-out portion to a position abutting the bottom of the pipeline for expansion of the expandable portion. Continued rotation of the stem downwardly advances the plug assembly guide to exert a first force externally and downwardly upon the expandable portion and move the insert portion into the expandable portion reduced second chamber to exert a second force internally and radially outwardly upon the expandable portion. Thus the expandable portion is expanded outwardly into sealing relation with the pipeline to block flow in the pipeline.

20 Claims, 12 Drawing Figures

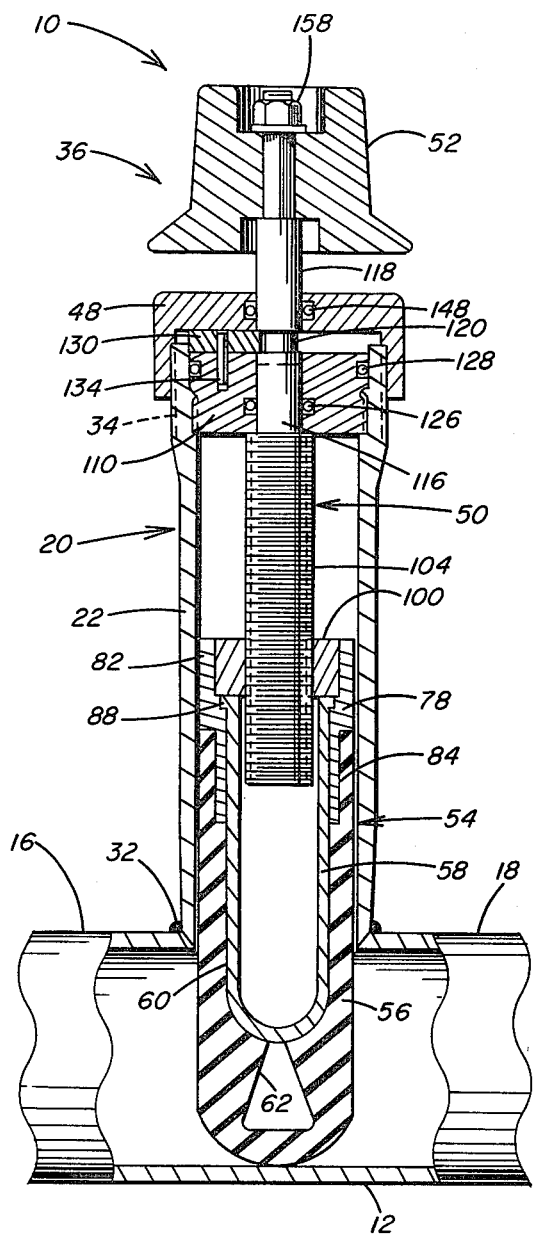
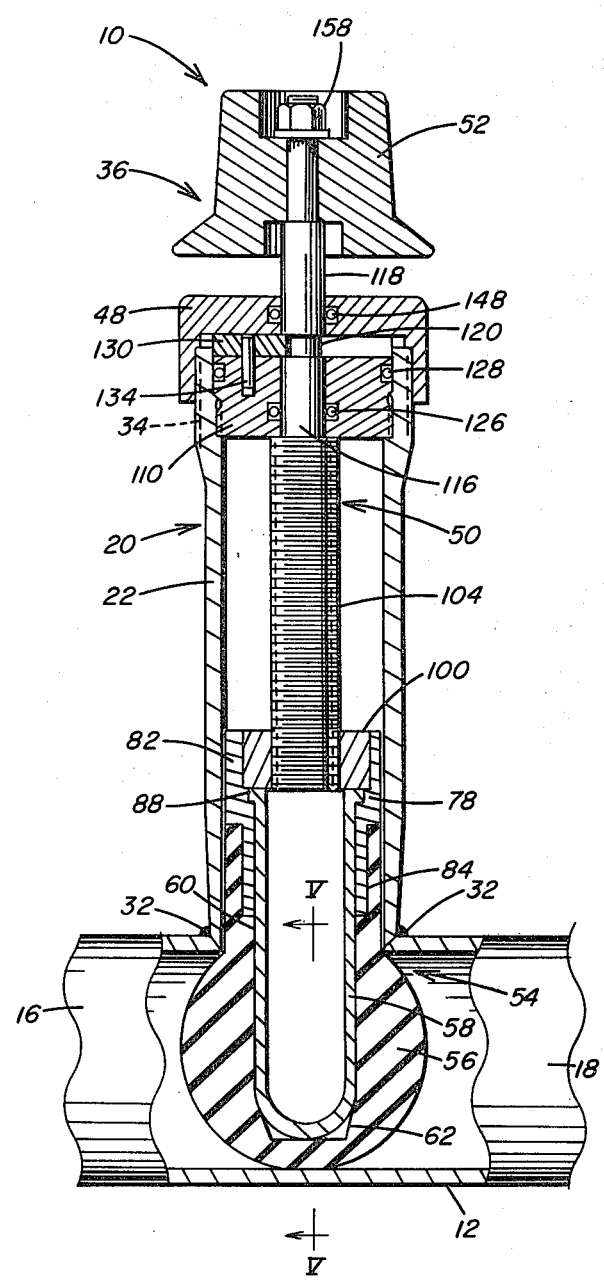
FIG. 3
FIG. 4

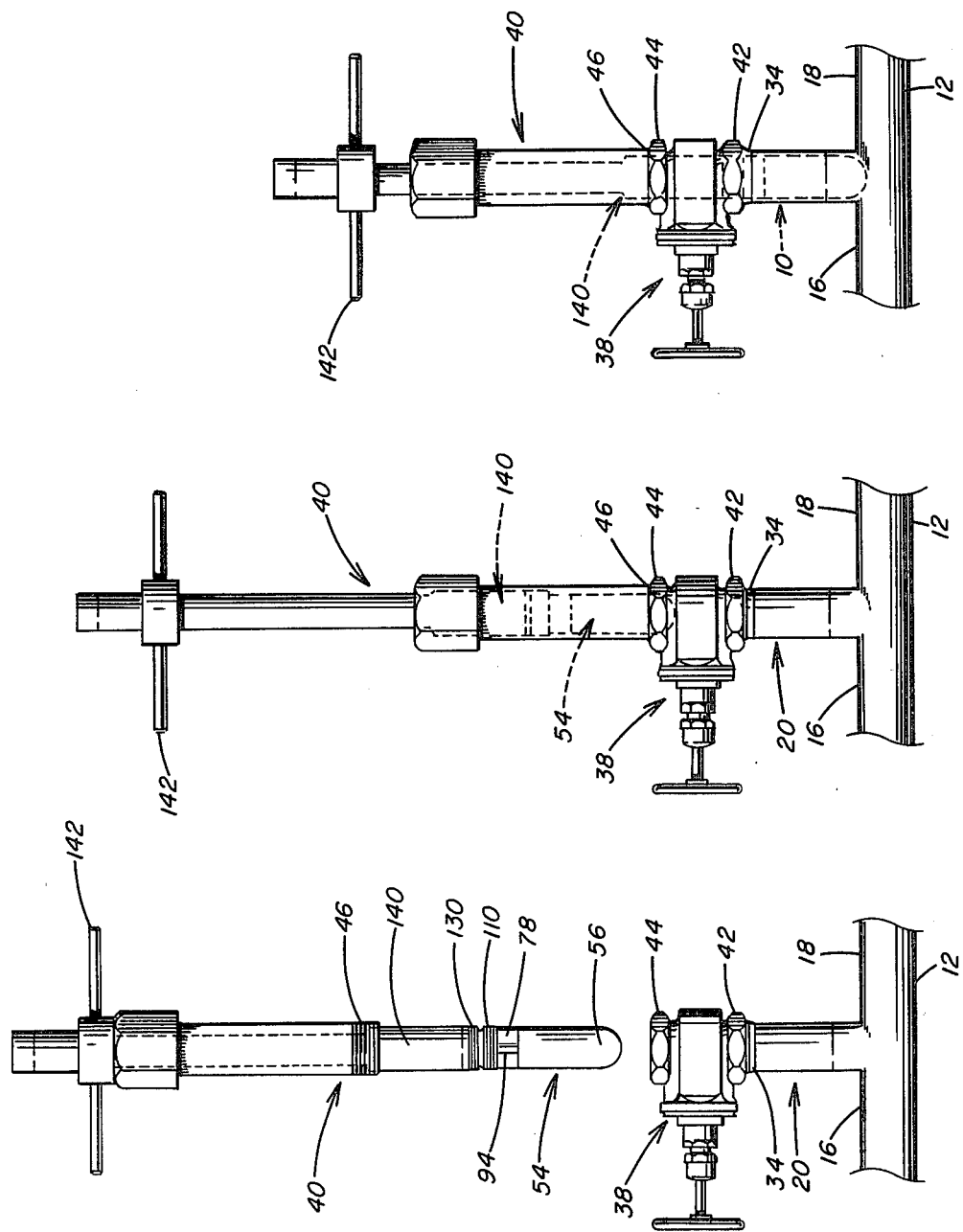

PIPE STOPPER METHOD AND APPARATUS

BACKGROUND OF THE INVENTION

1. Field of the Invention

This invention relates to a pipe stopper method and apparatus and more particularly to an expandable plug assembly movable into and out of a pipeline to block or permit flow of fluid therethrough by rotation of a nonrising stem to exert both external and internal forces upon an expandable plug to expand the plug outwardly into sealing engagement with the interior of the pipeline.

2. Description of the Prior Art

It is well known in the art of distribution pipelines, either gas or water, to insert a deformable pipe stopper into a transverse cut-out portion of the pipeline and deform the pipe stopper to shut off the flow of fluids through the pipeline. When a pipeline is severely ruptured, and in order to minimize the number of customers having interrupted service, it is preferred that the pipeline be sectionalized without the need to add a full cut-in type valve which is generally installed during initial construction of the pipeline. Sectionalizing with full cut-in type valves is a complex operation that is very time consuming.

An add-on stopper valve, as disclosed in U.S. Pat. No. 3,799,182, utilizes an add-on pipe stopper attached to an existing pipeline as an alternative to the full cut-in type valve. This type of add-on pipe stopper does not require shutdown or interruption of pipeline service during the installation of the stopper valve, as do the full cut-in type valves. This type of add-on stopper valve reduces the time and costs of installation of the pipeline sectionalizing operation. More valves can be installed to complete the sectionalizing program with a minimum of interruption to the pipeline customers. U.S. Pat. Nos. 2,763,282 and 2,740,606 also disclose stopper elements deformable in a pipeline to shut off fluid flow.

To install the add-on stopper valve as disclosed in U.S. Pat. No. 3,799,182 a fitting is welded to the pipeline at the location of cutting an opening into the pipeline at the point where flow through the pipeline is to be interrupted. After the fitting is installed a gate valve is secured to the fitting and a saw chamber assembly is threadedly secured within the gate valve assembly. The gate valve is opened and a saw blade is inserted through the valve and the fitting into contact with the pipeline to cut a hole or opening into the pipeline. Thereafter, the saw blade is retracted into the saw chamber assembly and the gate valve is closed to prevent the escape of fluid from the cut pipe. An insertion chamber assembly for the pipe plug is threadedly engaged to the gate valve and the pipe plug is pushed through the open gate valve and affixed to a holding chamber. Thereafter both the insertion chamber assembly and the gate valve are removed. A completion bonnet is then attached to the holding chamber. Manipulation of the completion bonnet extends the pipe plug into the pipeline. The pipe plug is solid and when compressed against the side wall of the pipe deforms and spreads to close off the pipe.

One of the problems encountered with stopper devices of the above type is distortion of the plug resulting from excessive force application to deform the plug. If the magnitude of the external compressive forces applied to a solid elastomeric plug exceeds a predetermined limit, then the deformed plug will separate from the wall of the pipeline forming a leak path around the plug. Thus precaution must be exercised to prevent this excessive force application. However, operators have a tendency to apply excessive force in an effort to assure a bubble-tight fit. Without a satisfactory means of limiting the force application beyond the point where distortion begins, the operator must rely on judgment and experience to limit the force application. It is also the practice to coat the plug prior to insertion with a suitable material, such as grease, to seal a leak path which develops upon use of the pipe plug.

As an alternative to the solid one piece elastomeric stoppers disclosed in U.S. Pat. Nos. 3,799,182 and 2,763,282, U.S. Pat. No. 2,740,606 utilizes a pipe stopper that is internally expandable and includes a cylindrical plug sleeve of a relatively thin wall thickness. The sleeve is preferably formed of resilient material and has radial vanes. Wedging members are positioned within the sleeve and upon rotation of a screw, the wedges are moved on the vanes to either expand or contract the sleeve. In addition, the sleeve is also expanded by the flow of fluid on the upstream side of the stopper into the sleeve. U.S. Pat. No. 3,040,779 also discloses a plug device that includes a thin walled packing element that is adapted to be inflated by a pressure medium. These devices must be maintained under pressure to retain a fluid tight seal in the pipeline. Also due to the thin wall structure they are not as durable as solid plugs.

While it has been suggested to provide add-on stopper valves that utilize deformable plugs that are deformed by external forces applied to the plug and expandable plugs that are expanded by internal forces applied to the plug, there is need for an expandable stopper that does not require the use of fluid forces to apply an internal expanding pressure on the plug and possesses the durability of deformable solid plugs. The expandable plug must be capable of repeated cycles of expansion and contraction into and out of sealing relation with the pipeline and provide continued stopper service. The expandable plug must also be sufficiently durable to insure that upon each expansion cycle it completely engages the interior of the pipeline. Also, the expansion of the plug must be limited so as not to apply excessive forces resulting in distortion and leak paths around the plug.

SUMMARY OF THE INVENTION

In accordance with the present invention there is provided pipe stopper apparatus that includes a fitting having a tubular body portion adapted to be secured to a pipeline in surrounding relation with a cut-out portion of the pipeline. The tubular body portion has a longitudinal passageway and a lower open end portion. A plug assembly is positioned in the passageway. The plug assembly includes an expandable portion and an insert portion. The expandable portion includes a body portion surrounding a chamber formed in the expandable portion. A plug assembly guide is positioned in the passageway between the expandable portion and the insert portion for longitudinal movement in the passageway. Guide means guide the plug assembly guide for longitudinal, nonrotational movement in the passageway. A stem is positioned for rotation in the passageway. The plug assembly guide is connected to the stem for longitudinal movement relative to the stem. Operator means rotates the stem to nonrotatably, longitudinally move the plug assembly guide in the passageway. The plug assembly guide is movable in the passageway to a first position to advance the plug assembly through the lower open end portion and the cut-out portion to a position in the pipeline for expansion of the expandable portion. The plug assembly guide is operable upon continued rotation of the operator means to move relative to said expandable portion from the first position to a second position in the passageway to advance the insert portion into the chamber and exert an out outward internal force upon the expandable portion body portion to expand the body portion into sealing engagement with the interior of the pipeline to block flow in the pipeline.

Retainer means connected to the tubular body portion rotatably supports the stem in the passageway. The retainer means is positioned in the passageway to close the upper open end portion thereof. The retainer means prevents relative axial movement of the stem in the passageway as the stem rotates.

Preferably the retainer means is threadedly connected to the tubular body portion in the upper open end portion and includes a bonnet threadedly secured to the open upper end portion of the fitting within the passageway. A stem retainer is positioned in overlying relation with the bonnet and is nonrotatably connected thereto. The bonnet and the stem retainer have aligned bores through which the upper end of the stem extends. The stem includes a reduced diameter portion that is engaged by the stem retainer to maintain the stem in a preselected axial position within the fitting for rotational, nonaxial movement in the passageway.

The plug assembly guide is axially movable relative to the stem below the bonnet. The guide means includes longitudinally extending slots in the body of the fitting. The plug assembly guide has portions in the slots to prevent rotation of the plug assembly guide upon rotation of the stem. The slots have a preselected length with an abutment formed by a shoulder on the fitting body portion at the end of each slot. When the plug assembly guide has advanced to the second position, it is restrained from further downward movement by contact with the abutment. In moving from the first position to the second position the plug assembly guide exerts a downward external or second force upon the expandable portion to combine with the outward internal or first force upon the expandable portion to expand the expandable portion outwardly into sealing engagement with the interior of the pipeline. Fluid flow through the pipeline at the location of the expandable portion is thus blocked.

The plug assembly guide includes a stem bushing that is positioned on the threaded end of the stem below the retainer means. Rotation of the stem axially advances the stem bushing and the plug assembly guide without rotation downwardly in the fitting passageway. The plug assembly is movable with the plug assembly guide and is advanced to a first position in the pipeline corresponding to the first position of the plug assembly guide in the fitting. Continued rotation of the operator means axially advances the plug assembly guide to the second portion in the fitting and forces the insert portion from an enlarged portion of the plug chamber into a reduced or constricted portion of the plug chamber. In this manner the plug expandable portion is expanded outwardly into contact with the interior walls of the pipeline and is maintained in sealing contact with the interior walls.

Downward movement of the plug assembly guide with the expandable portion remaining axially fixed and abutting the bottom of the pipeline applies an external force downwardly upon the expandable portion. Simultaneously therewith the insert portion is advanced into the constricted chamber portion of the expandable portion. The insert portion forces the expandable portion to expand outwardly or radially from the insert portion. The application of the external and internal forces upon the expandable portion expands the expandable portion into sealing relation with the interior walls of the pipeline.

The outside diameter of the expandable portion is substantially greater than the inside diameter of the constricted chamber portion that receives the insert portion. This provides the expandable portion with a body portion of a substantial thickness in contact with the interior of the pipeline. The insert portion is a rigid member that reinforces the body portion of the expanded plug to prevent collapse or separation of the expanded plug from the interior walls of the pipeline. With this arrangement the expanded portion of the plug assembly is maintained in sealing relation with the pipeline so that flow through the pipeline downstream of the cut-out portion is blocked.

The insert portion does not move into the constricted chamber of the expandable portion until the expandable portion is positioned in abutting relation with the bottom of the pipeline. Continued axial movement of the plug assembly guide at this point advances the insert portion into the constricted chamber to exert outward radial forces upon the expandable portion. The expandable portion then expands into conformity with the outline of the interior of the pipeline to block fluid flow through the pipeline.

When the insert portion is moved into the expandable portion and the expandable portion expands, further downward movement of the plug assembly guide and the insert portion is restrained by contact with the abutments at the end of the guide slots. In this manner the external force applied by the plug assembly guide on the expandable portion is limited so that excessive external forces are not applied to the expandable portion in its expanded state. The expanded plug will not separate from the pipeline walls to prevent leak paths from forming between the wall of the pipeline and the expanded plug.

Further in accordance with the present invention, there is provided a method of sectionalizing a pipeline and blocking fluid flow in the pipeline that includes the steps of positioning an expandable plug in a fitting secured to the pipeline in surrounding relation with a cut-out portion of the pipeline. A plug insert is positioned within the expandable plug. A plug guide is supported for nonrotational axial movement in the fitting. The plug guide is connected to the plug insert in contact with the expandable plug. The plug guide axially moves in the fitting to advance the expandable plug through the cut-out portion into abutting relation with the bottom of the pipeline. Thereafter, an external force is applied by downward movement of the plug guide upon the expandable plug to advance the plug insert into the expandable plug. An internal force is applied by movement of the plug insert into the expandable plug to outwardly expand the expandable plug into sealing engagement with the interior walls of the pipeline and thereby block fluid flow therethrough.

Accordingly the principal object of the present invention is to provide pipe stopper method and apparatus for effectively blocking fluid flow through a pipeline to permit emergency repair of a damaged pipeline while in service by utilizing an expandable stopper plug movable into and out of sealing engagement with the pipeline where the pipe stopper apparatus is attached to the pipeline in a manner to permit a continued operation of the plug into and out of the pipeline to block or permit a fluid flow through the pipeline.

Another object of the present invention is to provide an emergency stopper for sectionalizing distribution pipelines by an expandable plug that is supported for movement into and out of the pipeline to be blocked where expansion only occurs when the stopper is in a preselected position for expansion within the pipeline.

A further object of the present invention is to provide a method and apparatus for expanding an emergency stopper plug into sealing engagement within the interior of a pipeline to block flow through the pipeline by the simultaneous application of an external force upon an expandable member and an internal force outwardly against the expandable member to expand the stopper plug into sealing engagement with the interior walls of the pipeline to block flow therethrough.

These and other objects of the present invention will be more completely disclosed and described in the following specification, the accompanying drawings, and the appended claims.

BRIEF DESCRIPTION OF THE DRAWINGS

FIG. 3 is an fragmentary sectional view of the pipe stopper apparatus, illustrating the expandable plug assembly advanced into position in the pipeline prior to expansion.

FIG. 4 is a view similar to FIG. 3, illustrating the plug assembly expanded into sealing engagement with the interior walls of the pipeline.

FIG. 6 is a schematic view of the pipe stopper apparatus positioned for insertion through a gate valve that is attached to the upper end of a fitting which is secured to the pipeline to be blocked.

FIG. 7 is a schematic view illustrating the step of inserting the pipe stopper apparatus into position for advancement through the gate valve.

FIG. 8 is schematic view illustrating insertion of the pipe stopper apparatus through the open gate valve into position within the fitting that supports the pipe stopper apparatus for movement into and out of the pipeline.

DESCRIPTION OF THE PREFERRED EMBODIMENT

Figure 1:
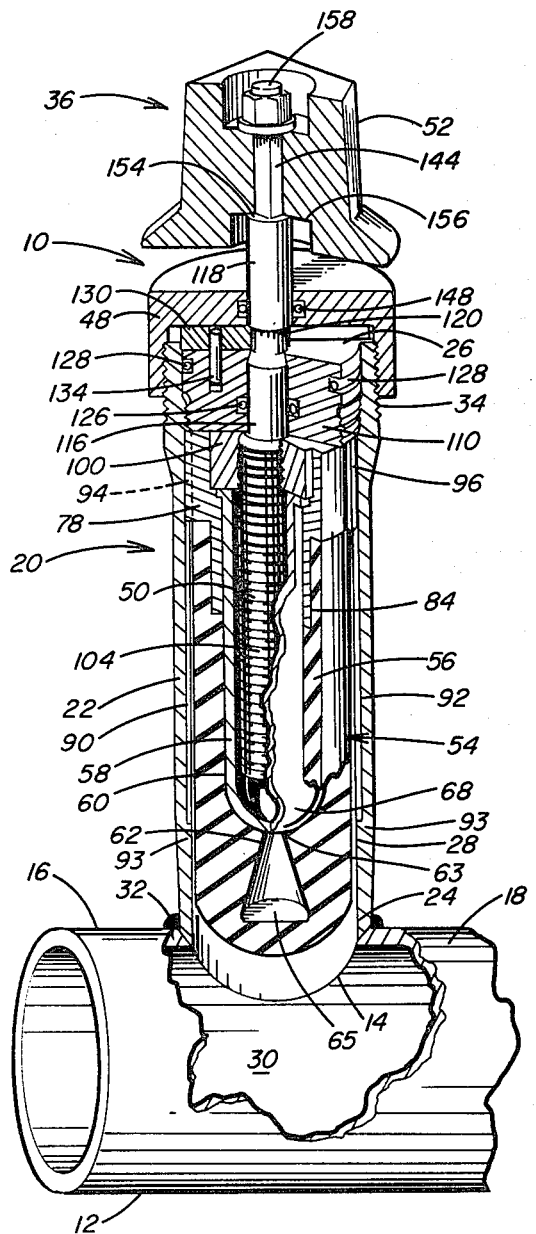
FIG. 1 is a fragmentary perspective view, partially broken away and in section, of a pipe stopper apparatus attached to a pipeline to be blocked, illustrating an expandable plug assembly supported for movement into the pipeline for expansion into sealing engagement with the pipeline to block flow therethrough.

Referring to the drawings and particularly to FIGS. 1, 2, and 6–8, there is illustrated a pipe stopper apparatus generally designated by the numeral 10 for sectionalizing a distribution pipeline 12 for the conveyance of fluid, such as natural gas, water, or the like, under pressure to permit emergency repair of a leak in the pipeline 12 caused by damage thereto while in service or to provide an add-on valve for permanent fluid flow control in the pipeline 12. The pipe stopper apparatus 10 is inserted through an aperture or cut-out section 14 in the pipeline 12. The cut out section 14 is transverse to the direction of fluid flow through the pipeline 12. When in an operative position in the pipeline 12, the pipe stopper apparatus 10 blocks fluid flow through the pipeline 12 at the cut-out section 14. With this arrangement fluid flow in an upstream portion 16 of the pipeline 12 is prevented from entering or passing to a downstream portion 18 of the pipeline 12.

The pipe stopper apparatus 10 includes a fitting 20 having a tubular body portion 22 secured to the pipeline 12 in surrounding relation with the cut-out section 14. The tubular body portion 22 has a lower open end portion 24 and an upper open end portion 26 with a longitudinal passage 28 extending therethrough. As illustrated in FIG. 1, the tubular body portion 22 is positioned in abutting relation with the pipeline 12 in surrounding relation with the cut-out section 14. The size of the opening in the body portion lower open end portion 24 is at least equal to or greater than the opening through the cut-out section 14 to provide a connection of the passageway 28 with a passageway 30 of the pipeline 12. A sealed connection of the lower end portion of the fitting 20 to the pipeline 12 around the cut-out section 14 is accomplished by either welding, as illustrated by the welds 32 in FIG. 1, or by bolting in a well known manner (not shown in FIG. 1).

The upper end portion 26 of the fitting tubular body portion 22 is provided with an externally threaded portion 34 opposite the upper open end portion 26. An operator assembly generally designated by the numeral 36 is threadedly engaged to the fitting externally threaded portion 34 once the pipe stopper apparatus 10 has been inserted in position for operation in the fitting 20. However, prior to installation of the operator assembly 36 on the fitting 20, a conventional gate valve generally designated by the numeral 38 in FIG. 6 is threadedly secured to the externally threaded portion 34. The gate valve 38, which is not included in the scope of the present invention, is secured to the fitting 20 after the fitting 20 has been welded to the pipeline 12 at the location where fluid flow through the pipeline passageway 30 is to be interrupted.

The fitting 20 is welded to the pipeline 12 before the cut-out section 14 is cut in the pipeline 12. To form the cut-out portion 14, a drill (not shown) in a well known manner is passed through the open gate valve 38 to cut the opening 14 in the pipeline 12. After the cut-out section 14 is formed the drill is withdrawn from the fitting 20 and the gate valve 38 is closed to prevent escape of fluid from the drilled pipeline 12. After the drill is removed from the fitting 20, the pipe stopper apparatus 10 is inserted through the gate valve 38 and into the fitting 20.

As illustrated in FIG. 6, a suitable insertion tool, generally designated by the numeral 40, is connected to the pipe stopper apparatus 10 to facilitate insertion of the apparatus 10 in the fitting 20. The insertion tool 40 is not included within the scope of the present invention and therefore will not be described in detail herein. The gate valve 38 includes a lower flange portion 42 connected to the fitting externally threaded portion 34 and an upper flange portion 44 through which the apparatus 10 is initially inserted.

As illustrated in FIG. 7, prior to insertion in the fitting 20, the apparatus 10 is withdrawn into the body of the insertion tool 40. Thereafter, a lower externally threaded portion 46 of the insertion tool 40 is connected to the upper flange portion 44. Once the insertion tool 40 is connected to the gate valve 38, the gate valve 38 is opened. By operation of the insertion tool 40, the pipe stopper apparatus 10 is moved from the position in the insertion tool 40 illustrated in FIG. 7 to the position in the fitting 20, illustrated in FIG. 8.

When the pipe stopper apparatus 10 is positioned in the fitting 20, as illustrated in FIG. 8, further manipulation of the insertion tool 40 secures the apparatus 10 to the fitting 20 in the fitting passageway 28, as illustrated in FIG. 1. When the apparatus 10 is secured to the fitting 20, the insertion tool 40, is then disengaged from the gate valve flange 44. FIG. 1 illustrates the position of the pipe stopper apparatus 10 in the fitting 20 after the insertion tool 40 has been removed from engagement with the gate valve 38 prior to lowering of the pipe stopper apparatus 10 into the pipeline passageway 30.

Figure 2:
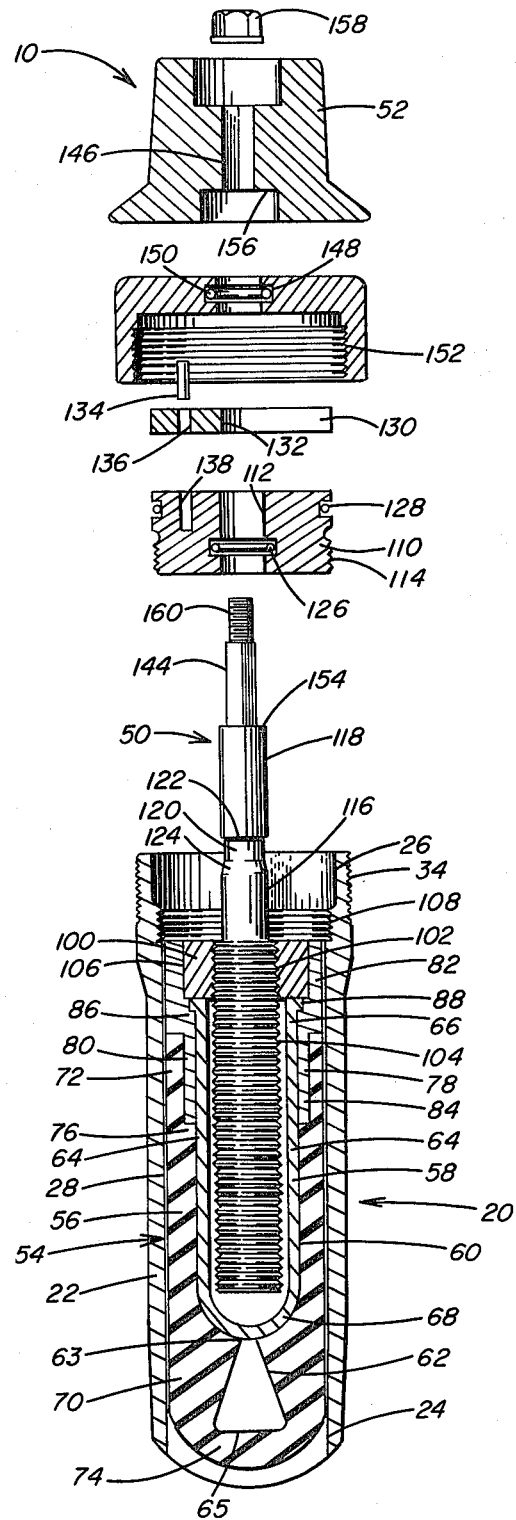
FIG. 2 is an exploded sectional view in side elevation of the pipe stopper apparatus shown in FIG. 1.

Once the apparatus 10 is in position, the gate valve 38 is removed from the fitting 20 and the operator assembly 36 is installed on the fitting 20. Referring to FIGS. 1 and 2, rotation of the operator assembly 36 effects lowering of the pipe stopper apparatus 10 into the pipeline passageway 30. Also by rotation of the operator assembly 36 in a first direction, the pipe stopper rotation 10 is expanded into sealing engagement with the interior walls of the pipeline passageway 30. Rotation of the operator assembly 36 in the opposite direction permits contraction of the pipe stopper apparatus 10 and removal from the pipeline 12.

The operator assembly 36 includes a cap 48 that is adapted for threaded engagement with the fitting externally threaded portion 34. A stem 50 of the pipe stopper apparatus 10 is rotatably supported by the cap 48, in a manner to be described later in greater detail. An operator 52 also forming an element of the operator assembly 36 is nonrotatably connected to the upper end of the stem 50.

The operator 52 is secured in place on the stem 50 after threadedly engaging the cap 48 to the fitting 20. The cap 48 threadedly engages the fitting externally threaded portion 34 to which the gate valve flange 42 was secured. Once the cap 48 and the operator 52 are assembled on the fitting 20 and the stem 50 respectively, as illustrated in FIG. 1, the pipe stopper apparatus 10 is operable for movement into and out of the pipeline 12 to block or permit the flow of fluid through the passageway 30 past the cut-out section 14.

A plug assembly generally designated by the numeral 54 is nonrotatably, longitudinally movable in the fitting passageway 28. The plug assembly 54 includes an expandable portion 56 and an insert portion 58. The expandable portion 56 includes an enlarged first chamber 60 and a reduced second chamber 62. The reduced second chamber 62 communicates with the enlarged first chamber 60 through a constricted opening 63. The insert portion 58 is initially positioned in the enlarged first chamber 60.

The insert portion 58 includes a tubular body 64 having an open upper end portion 66 and a closed lower end portion 68. The tubular body portion 64 has substantially a cylindrical configuration and is positioned in abutting relation with the interior cylindrical wall of the insert portion 58. The tubular body portion 64 extends substantially the length of insert portion enlarged first chamber 60. Preferably the expandable portion 56 is fabricated of an elastomeric material capable of expansion and contraction.

As will be explained later in greater detail, the expandable portion 56 is expandable by movement of the insert portion 58 from the enlarged first chamber 60 into the reduced second chamber 62, as illustrated in FIGS. 3 and 4, to block the flow of fluid in the pipeline passageway 30 from the upstream portion 16 to the downstream portion 18. The expandable portion 56 of the plug assembly 54 has an expandable body portion 70 adaptable for movement through the passageway 30 and the pipeline cut-out section 14 into and out of the pipeline 12.

The expandable body portion 70 has a preselected thickness between the inner and outer walls formed by the enlarged first chamber 60 and the reduced second chamber 62. The enlarged first chamber 60 is substantially greater in length than the reduced second chamber 62. The cross sectional area of the enlarged first chamber 60 is substantially uniform along the length of the chamber 60. The reduced second chamber 62, however, has the constricted open end 63 and an enlarged closed end 65.

FIGS. 1–4 illustrate one example of a selected configuration of the reduced second chamber 62 where the cross sectional area of the chamber 62 increases from the open end 63 that communicates with the first chamber 60 to the closed end 65. As illustrated in FIG. 4, the insert portion 58, in accordance with the present invention, is movable from the enlarged first chamber 60 into the reduced second chamber 62 to advance substantially the length of the reduced second chamber 62 from the open end 63 to the closed end 65.

The configuration of the reduced second chamber 62 is selective. FIGS. 9–12 illustrate further examples of selected embodiments of the cross sectional configuration of the reduced second chamber 62 of the plug expandable portion 56. The primary feature of the reduced second chamber 62 is expansion of the expandable body portion 70 by movement of the insert portion 58 into the reduced second chamber 62. Therefore, it should be understood that any cross sectional configuration of the plug expandable portion 56 that permits expansion in this manner is operable with the present invention.

The reduced second chamber 62 must have a cross sectional area of a dimension to forcibly accept the insert portion 58. Thus the insertion of the insert portion 58 into the plug assembly second chamber 62 exerts a force internally upon the expandable portion 56. Exertion of an internal force expands the expandable portion 56 outwardly into sealing relation with the interior walls of the pipeline 12.

Figure 5:
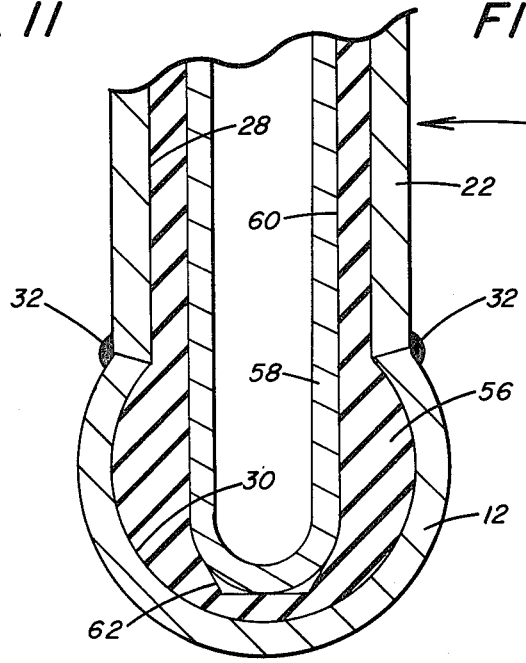
FIG. 5 is a fragmentary sectional view taken along line V—V of FIG. 4, illustrating the sealing engagement of the expanded plug assembly with the interior of the pipeline to block flow through the pipeline downstream of the expanded plug assembly.

Expansion of portion 56 does not occur until the expandable portion 56 is in position abutting the bottom of the pipeline 12 opposite the cut-out section 14, as illustrated in FIG. 3. Expansion of the expandable portion 56 by forcibly receiving the insert portion 58 expands the expandable portion 56 into sealing engagement with the interior walls of the pipeline 12 as illustrated in FIGS. 4 and 5 to block fluid flow in the pipeline 12 at the point of insertion of the pipe stopper apparatus 10.

As illustrated in FIG. 2, the enlarged first chamber 60 has an open end 72 and an inner shoulder 76 adjacent thereto. With this arrangement an annular space is formed around the insert portion 58 for receiving a plug assembly guide 78. The plug assembly guide 78 has a cylindrical body portion 80 including an enlarged diameter upper portion 82 and a reduced diameter lower portion 84.

The plug assembly guide 78 is extended into the annular space between the expandable portion 56 and the insert portion 58 to a position where the end of the body portion reduced diameter lower portion 84 abuts inner shoulder 76, as illustrated in FIG. 2. The enlarged diameter upper end portion 82 is positioned in abutting relation with the upper end of the expandable portion 56. The plug assembly guide 78 also includes an inner shoulder 86.

The insert portion 58 includes at the open upper end portion 66 an outwardly extending lip 88 that engages the guide shoulder 86 thereby securing the plug assembly guide 78 between the insert portion 58 and the expandable portion 56. Also, in order to further secure the plug assembly guide 78 to the expandable portion 56, the reduced diameter lower portion 84 of the body portion 80 can be bonded to the body portion of the expandable portion 56 above the inner shoulder 76. With this arrangement the plug assembly guide 78 is secured to both the expandable portion 56 and the insert portion 58. Thus the expandable portion 56 and the insert portion 58 are movable with the plug assembly guide 78 in the fitting passageway 28.

As illustrated in FIG. 1, the fitting tubular body portion 22 is provided with integral guide means, such as a pair of longitudinally extending slots 90 and 92 positioned oppositely of one another in the fitting body portion 22. The slots 90 and 92 are diametrically opposed and have a preselected width and a preselected length as determined by the length of the plug expandable portion 56 and and the degree of penetration of the expandable portion 56 into the pipeline 12 required for effectively sealing the pipeline 12 upon expansion of the expandable portion 56. Also, as illustrated in FIG. 1, the plug assembly guide 78 is provided with a pair of diametrically opposed ears 94 and 96 operable to be positioned in the slots 90 and 92 respectively. The slots 90 and 92 each terminate at a shoulder 93 shown in FIG. 1.

The ears 94 and 96 have a width corresponding to the width of the slots 90 and 92 permitting vertical movement of the ears 94 and 96 in the slots 90 and 92. This arrangement permits downward vertical movement of the plug assembly guide 78 in the fitting 20 until the ears 94 and 96 abut the shoulders 93. Also, as will be explained later in greater detail, the provision of the ears 94 and 96 of the plug assembly guide 78 received in the longitudinally extending slots 90 and 92 prevent rotation of the plug assembly guide 78, the expandable portion 56 and the insert portion 58 in the fitting 20. Thus by providing the tubular body portion 22 of the fitting 20 with integral guide means in the form of the slots 90 and 92 substantially the length of the passageway 30, the plug assembly guide 28 by engagement of the ears 94 and 96 in the slots 90 and 92 is guided for longitudinal, nonrotational movement in the passageway 30.

As illustrated in FIG. 1, a stem bushing 100 is positioned concentrically within the enlarged diameter upper portion 82 of the plug assembly guide 78 in surrounding relation with the stem 50. The stem bushing 100 includes an internally threaded bore 102 that threadedly engages a threaded portion 104 of the stem 50. An externally threaded portion 106 is threadedly engaged to the plug assembly guide enlarged diameter portion 82. The stem bushing 100 is threaded downwardly on the stem threaded portion 104 to a position where the stem bushing 100 abuts the lip 88 of the insert portion 58. In this manner, the stem bushing 100 secures the plug insert portion 58 within the plug enlarged first chamber 60.

As illustrated in detail in FIG. 2, the fitting tubular body portion 22 includes an internally threaded portion 108 positioned below the upper open end portion 26. A bonnet 110 is extended through the upper open end portion 26 into threaded engagement with the fitting internally threaded portion 108. The bonnet 110 is provided with a bore 112 through which the stem 50 extends to position a threaded portion 114 of the bonnet 110 in threaded engagement with the fitting internally threaded portion 108. The portion of the stem 50 above the threaded portion 104 includes cylindrical portions 116 and 118 separated by a reduced diameter portion 120 thereby forming opposite shoulders 122 and 124.

In the assembled structure as illustrated in FIG. 1, the bonnet 110 surrounds the stem cylindrical portion 116 and includes an O-ring 126 retained in an annular recess of the bonnet 110 in surrounding and sealing relation with the stem cylindrical portion 116. The O-ring 126 is operable as a dynamic seal around the stem 50 in the bonnet 110. Similarly the bonnet 110 carries an O-ring 128 on the outer surface thereof. The O-ring 128 sealingly engages the interior wall of the fitting upper open end portion 26 to thereby provide a static seal at the interface of the fitting 20 and the bonnet 110.

As further illustrated in FIGS. 1 and 2, a stem retainer 130 having a horseshoe-shaped configuration is positioned on the stem 50 in surrounding relation with the reduced diameter portion 120 between the cylindrical portions 116 and 118 in abutting relation with the shoulders 122 and 124. The stem reduced diameter portion 120 extends through a slot 132 of the stem retainer 130. In addition the stem retainer 130 is nonrotatably secured to the bonnet 110 by a retainer pin 134. The retainer pin 134 extends through a bore 136 of the stem retainer 130 into a bore 138 in the bonnet 110. The stem retainer 120 may also be connected to the bonnet 110 by a screw, a drive stud or the like. With this arrangement, as illustrated in FIGS. 1 and 3, the stem retainer 130 is connected to the bonnet 110 which is, in turn, threadedly secured within the upper end portion 26 of the fitting 20.

The slot 132 of the stem retainer 130 permits the retainer 130 to be moved into and out of position on the stem 50 between the stem cylindrical portions 116 and 118 in surrounding relation with the reduced diameter portion 120 of the stem 50. The stem retainer 130 is prevented from moving axially on the stem 50. The portion of the stem retainer 130 surrounding the slot 132 engages the shoulders 122 and 124 on the stem 50. The horseshoe-shaped stem retainer 130 supports the weight of the stem 50 and the plug assembly 54. Furthermore, this arrangement provides accurate positioning of the plug assembly 54 on the stem 50. The stem 50 is also freely rotatable in the slot 132 of the stem retainer 130 and in the bore 112 of the bonnet 110.

Prior to insertion of the pipe stopper apparatus 10 in the fitting 20, the bonnet 110 and the stem retainer 130 are connected to an end 140 of the insertion tool 40, as illustrated in FIG. 6. In operation to facilitate insertion of the plug assembly 54 into the fitting 20, the end 140 of the insertion tool 40 is connected to the upper flange portion 44 of the gate valve 38 as illustrated in FIG. 7. The gate valve 38 is then opened and by manipulation of a handle 142 of the insertion tool 40, the plug assembly 54 is advanced through the opened gate valve 38 and lowered into the fitting 20.

Once the plug assembly 54 is positioned in the fitting 20, as illustrated in FIG. 8, the insertion tool handle 142 is further rotated to position the plug assembly guide ears 94 and 96 in the longitudinal slots 90 and 92 of the fitting 20. When this engagement is complete, further rotation of the handle 142 in a preselected direction engages the threaded portion 114 of the bonnet 110 with the internally threaded portion 108 of the fitting 20. This threaded engagement of the bonnet 110 with the fitting 20 is illustrated in FIG. 1. Then the insertion tool handle 142 is further rotated to release the insertion tool from the plug assembly 54. The insertion tool 40 is then disengaged from gate valve 38 and the gate valve 38 removed from connection with the fitting externally threaded portion 34.

As illustrated in FIG. 2, the portion of the stem 50 above the stem cylindrical portion 118 includes a non-circular portion 144 formed by a plurality of planar faces adaptable to receive the planar faces of a non-circular bore 146 through the operator 52. Prior to assembling the operator 52 on the stem non-circular portion 144, the cap 48 is advanced downwardly on the stem circular portion 118. The cap 48 includes a bore 148 with an O-ring 150 positioned in an annular recess extending outwardly from bore 148. The cap 48 includes an internally threaded portion 152 that is threadedly engageable with the externally threaded portion 34 of the fitting 20.

The cap 48 is threadedly advanced on the fitting threaded portion 34 until the cap 48 abuts the stem retainer 130 as shown in FIG. 1. With the cap 48 in position, the operator 52 is then positioned on the stem non-circular portion 144. The stem circular portion 118 also includes an upper shoulder 154 which receives an internal shoulder 156 of the operator 52. The operator 52 is retained on the stem 50 by engagement of a nut 158 on a threaded upper end 160 of the stem 50. The threaded upper end 160 extends above the operator non-circular bore 146. Thus when attachment of the cap 48 to the fitting 20 and attachment of the operator 52 to the stem 50 is completed, the pipe stopper apparatus 10 is in position, as illustrated in FIG. 1, for insertion of the plug assembly 54 into the pipeline 12.

To advance the plug expandable portion 56 from the position, illustrated in FIG. 1, in the fitting 20 to a position, as illustrated in FIG. 3, for expansion in the pipeline 12, the operator 52 is rotated to, in turn, rotate the stem 50. With the stem 50 axially fixed within the fitting 20 by engagement of the stem retainer 130 with the stem reduced diameter portion 120 and the opposed shoulders 122 and 124, the stem 50 rotates but does not advance axially within the fitting 20. Rotation of the stem 50 urges the plug assembly guide 78 to nonrotatably advance downwardly in the fitting 20 from the position illustrated in FIG. 1 to the position illustrated in FIG. 3 where the expandable portion 56 is in abutting relation with the bottom of the pipeline 12.

The engagement of the stem retainer ears 94 and 96 with the fitting slots 90 and 92 permits the plug assembly guide 78 to nonrotatably, longitudinally advance from the position illustrated in FIG. 1 to the position illustrated in FIG. 4. This movement of the guide 78 moves the plug expandable portion 56 from a first position in the fitting 20, shown in FIG. 3, to a second or expanded position in the pipeline 12, shown in FIG. 4. In the first position the closed end portion 74 of the plug expandable portion 56 abuts the bottom of the pipeline 12. The insert portion 58 does not begin to exert an expandable force upon the expandable portion 56 until the expandable portion 56 is in position in the pipeline 12 abutting the bottom wall of the pipeline 12.

When the expandable portion 56 is in the position illustrated in FIG. 3, continued rotation of the operator 52 effects expansion of the expandable portion 56 into sealing engagement with the interior walls of the pipeline 12 to block flow at that point in the pipeline 12. Expansion of the expandable portion 56 is accomplished by application of both a downward external force upon the expandable portion 56 and an outward radial internal force upon the expandable portion 56. The combined forces expand the expandable portion 56 into sealing relation with the pipeline 12, as illustrated in FIGS. 4 and 5, to block flow in the pipeline 12.

Expansion of the expandable portion 56 into sealing relation with the interior wall of the pipeline 12 is accomplished by continued downward movement of the insert portion 58 upon rotation of the stem 50 relative to the expandable portion 56 retained axially fixed in the pipeline 12. The expandable portion 56 is restrained from axial movement because the closed end portion 74 is positioned in abutting relation at the bottom of the pipeline 12. The stem 50 is continuously rotated in a preselected direction to advance the expandable portion 56 from the position illustrated in FIG. 1 to the position illustrated in FIG. 4. Continued rotation of the stem 50 downwardly advances the plug assembly guide 78 in the fitting 20 until the ears 94 and 96 bottom in the fitting slots 90 and 92 in abutment with the shoulders 93 formed at the bottom of the slots 90 and 92.

As the plug assembly guide 78 moves downwardly from the position in FIG. 3 to the position in FIG. 4, the upper portion 82 of the guide 78 applies a downward external force upon the upper end of the expandable portion 56. Simultaneously with the application of the external force upon the expandable portion 56, an internal force is exerted radially outwardly upon the expandable portion 56 by movement of the insert portion 58 into the plug reduced chamber portion 62.

Because the cross sectional area of the insert portion 58 exceeds the cross sectional area of the second chamber portion 62, the plug insert 58 must be forced into the second chamber 62. Consequently the body portion of the expandable portion 56 is expanded outwardly into sealing engagement with the the interior walls of the pipeline 12. By the simultaneous application of an external force and an internal force upon the expandable portion 56 by downward movement of the plug assembly guide 78 and insertion of the insert portion 58 into the second chamber portion 62, the expandable portion 56 is expanded outwardly until the exterior surface of the expandable portion 56 is in abutting and sealing relation with the interior walls of the pipeline 12.

By limiting downward movement of the plug assembly guide 78 by contact of the ears 94 and 96 with the slot shoulders 93, the guide 78 is prevented from applying excessive forces upon the upper end of the plug expandable portion 56. Downward movement of the guide 78 is prevented. This assures that undue forces are not applied to the plug expandable portion 56. Consequently the expandable portion 56 does not become distorted and separate from sealing contact with the interior walls of the pipeline 12 to form leakpaths around the expanded plug 56. With this arrangement of preventing excessive expanding forces from being applied to the plug expandable portion 56, a bubble tight engagement of the expanded plug 56 with the pipeline 12 is assured and the plug 56 can not be overly expanded by excessive force application.

As illustrated in FIG. 5, the seal obtained between the expandable portion 56 and the pipeline 12 occurs at the cut-out section 14. At this location flow through the pipeline 12 is blocked when the expandable portion 56 has been expanded to conform to the configuration of the interior of the pipeline 12, as illustrated in FIGS. 4 and 5. In this position flow from the pipeline upstream portion 16 to the pipeline downstream portion 18 is interrupted.

Now referring to FIGS. 9-12 there is illustrated examples of selected cross sectional configurations of the reduced second chamber 62 of the expandable portion. Each section is taken through the plug assembly 54 at the interface between the enlarged first chamber 60 and the reduced second chamber 62. The sections illustrate the restriction provided by the respective reduced second chambers 62 to axial advance of the end of the insert portion 58 from the first chamber 60.

Figure 9:
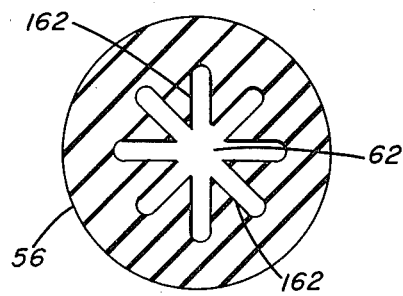
FIGS. 9–12 are sectional views of the expandable plug, illustrating examples of the configuration of an internal constricted chamber portion of the expandable plug.
Figure 10:
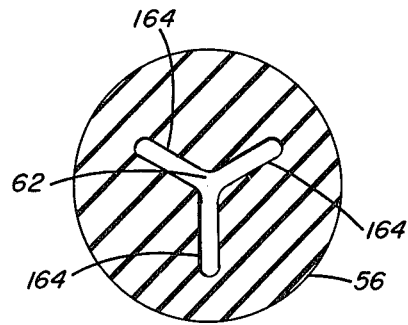
Figure 11:
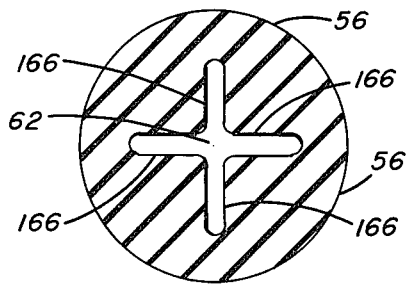
Figure 12:
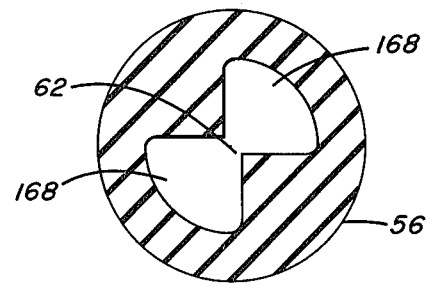

As illustrated in FIG. 9, the second chamber 62 is formed by a plurality of vanes 162 extending radially from the axis of the chamber 62. The chamber 62 in FIG. 10 is formed by Y-shaped vanes 164. In FIG. 11 adjacent vanes 166 are positioned at right angles to each other. In FIG. 12 quadrants 168 form the chamber 62.

These are just a few examples of the selective structure that can be utilized to form the reduced second chamber 62, and it should be understood that the structure of chamber 62 is not limited to these examples. The common feature is restriction provided by the chamber 62 to passage of the insert portion 58. The insert portion 58 must be forced into the chamber 62 resulting in an internal force exerted radially outwardly upon the expandable portion 56. This force expands the expandable portion 56 into sealing engagement with the interior walls of the pipeline 12. Once the portion 56 is expanded, the insert portion 58 serves to reinforce the expanded portion 56 against collapse and separation from the interior wall of the pipeline 12.

The feature of the insert portion 58 to reinforce the expanded portion 56 assures that the expanded portion 56 will not collapse and further provides the entire plug assembly 54 with a substantially solid body portion that is internally expanded in comparison with the thin walled, internally expanded devices of the prior art. With the present invention the outside diameter of the expandable portion 56 is substantially greater than the inside diameter of the constricted chamber portion 62, as illustrated in FIG. 5. This provides the expandable portion 56 with a body portion of a substantial thickness in contact with the interior walls of the pipeline 12.

The insert portion 58 also adds to the body portion of the expandable portion 56. The insert portion 58 is a rigid member that reinforces the portion 56 in an expanded state. Thus by combining the features of the expandable portion 56 having a substantial body portion and the insert portion 58, the expandable portion 56 is maintained in sealing engagement with the pipeline 12. This is accomplished without the need to maintain an internal fluid pressure within the expandable portion 56 to maintain it in sealed engagement with the pipeline 12.

Not only is the expandable portion 56 operable to be moved into sealing relation with the interior of the pipeline 12, it is also operable to be removed from sealing relation with the interior of the pipeline 12. This arrangement resumes fluid flow through the pipeline 12 after the flow has been blocked. To remove the expandable portion 56 from sealing relation with the interior of the pipeline 12, the operator 52 is rotated in a direction opposite to the direction of rotation required to expand the plug assembly 54. The operator 52 is rotated to retract the insert portion 58 from the reduced second chamber 62 to its initial position in the enlarged first chamber 60, as illustrated in FIG. 3. Thereafter continued rotation of the operator 52 advances the bushing 100 together with the plug assembly guide 78 upwardly on the stem 50. In this manner the entire plug assembly 54 is removed from the pipeline 12 to a position within the fitting 12 where the plug assembly 54 does not interrupt flow through the pipeline 12.

Thus with the present invention the pipe stopper apparatus 10 is operable to efficiently interrupt fluid flow at a point downstream of the insertion of the plug assembly 54 in the pipeline. The plug assembly 54 once installed is also operable for repeated movement into and out of sealing relation with the pipeline to block or permit the flow of fluid through the pipeline as desired.

According to the provisions of the patent statutes, I have explained the principle, preferred construction, and mode of operation of my invention and have illustrated and described what I now consider the represent its best embodiments. However, it should be understood that, within the scope of the appended claims, the invention may be practiced otherwise than as specifically illustrated and described.

I claim:

1. Pipe stopper apparatus comprising,
    a fitting having a tubular body portion adapted to be secured to a pipeline in surrounding relation with a cut-out portion of the pipeline, said tubular body portion having a longitudinal passageway and a lower open end portion,
    a plug assembly positioned in said passageway,
    said plug assembly including an expandable portion and an insert portion,
    said expandable portion including a body portion surrounding a chamber formed in said expandable portion,
    said chamber including an enlarged portion and a reduced portion with a constricted opening connecting said enlarged portion and said reduced portion,
    said insert portion being normally retained in said chamber enlarged portion for movement through said constricted opening, said constricted opening being shaped to provide resistance to movement of said insert portion therethrough so that said body portion expands upon movement of said insert portion from said chamber enlarged portion into said constricted opening and said chamber reduced portion,
    a plug assembly guide positioned in said passageway between said expandable portion and said insert portion for longitudinal movement in said passageway, guide means for guiding said plug assembly guide for longitudinal, nonrotational movement in said passageway, a stem positioned for rotation in said passageway, said plug assembly guide being connected to said stem for longitudinal movement relative to said stem, operator means for rotating said stem to nonrotatably, longitudinally move said plug assembly guide in said passageway relative to said expandable portion, said plug assembly guide being movable in said passageway to a first position to advance said plug assembly through said lower open end portion and the cut-out portion to a position in the pipeline for expansion of said expandable portion, and said plug assembly guide being operable upon continued rotation of said operator means to move from said first position to a second position in said passageway to force said insert portion into said constricted opening and said chamber reduced portion and exert an outward force upon said expandable portion body portion to expand said body portion into sealing arrangement with the interior of the pipeline to block flow in the pipeline.

2. Pipe stopper apparatus as set forth in claim 1 which includes, retainer means connected to said tubular body portion for rotatably positioning said stem in said passageway, said tubular body portion having an upper open end portion, said retainer means being positioned in said passageway way and closing said upper open end portion, and said retainer means preventing relative axial movement of said stem in said passageway.

3. Pipe stopper apparatus as set forth in claim 2 in which, said retainer means is threadedly connected to said tubular body portion in said upper open end portion, said retainer means being axially fixed in said tubular body portion, said stem having an upper end portion extending through said retainer means, and said stem being supported by said retainer means for axially fixed rotational movement in said fitting.

4. Pipe stopper apparatus as set forth in claim 1 in which, said guide means extend a preselected length on said tubular body portion surrounding said passageway, said plug assembly being engageable with said guide means, said plug assembly being restrained from rotating as rotation of said stem advances said plug assembly on said guide means, and said guide means permitting vertical movement of said plug assembly into a portion for effecting a seal within the pipeline.

5. Pipe stopper apparatus as set forth in claim 1 in which, said insert portion includes a rigid member positioned for movement in said chamber enlarged and reduced portions to reinforce said expandable portion being expanded into sealing engagement with the interior of the pipeline and prevent separation of said expandable portion from sealing engagement with the pipeline.

6. Pipe stopper apparatus as set forth in claim 1 in which, said guide means includes a plurality of longitudinally extending slots positioned in said tubular body portion, said slots each having a preselected length to permit nonrotational, longitudinal movement of said plug assembly insert portion a preselected distance from said chamber enlarged portion through said constricted opening into said chamber reduced portion to expand said expandable portion body portion into sealing contact with the interior of the pipeline, and said plug assembly guide having means for engaging said slots so that upon rotation of said stem said plug assembly guide nonrotatably advances longitudinally in said tubular body portion.

7. Pipe stopper apparatus as set forth in claim 1 which includes, a bushing concentrically positioned in said tubular body portion and threadedly engaged to said stem, said plug assembly guide being nonrotatably secured in surrounding relation to said bushing, said plug assembly guide being connected to said plug assembly, and said bushing being arranged to advance axially within said fitting upon rotation of said stem.

8. Pipe stopper apparatus as set forth in claim 1 in which, said plug assembly guide includes a lower end portion bonded to said expandable portion so that movement of said plug assembly guide is transmitted to said expandable portion.

9. Pipe stopper apparatus as set forth in claim 1 in which, said plug assembly guide has an internal annular shoulder portion, and said insert portion having an outwardly extending lip engageable with said internal annular shoulder portion so that movement of said plug assembly guide is transmitted to said insert portion.

10. Pipe stopper apparatus as set forth in claim 1 in which, said retainer means includes a stem retainer positioned in said tubular body portion, said stem retainer having a slot for receiving said stem, said stem being rotatable relative to said stem retainer in said slot, a bonnet threadedly secured to said tubular body portion within said passageway, said stem retainer being nonrotatably connected to said bonnet, said stem extending through said bonnet, and said stem being rotatably supported by said stem retainer and said bonnet for nonaxial movement in said passageway.

11. Pipe stopper apparatus as set forth in claim 1 in which, said expandable portion is positioned in abutting relation with the bottom of the pipeline when said plug assembly guide is in said first position in the pipeline before said insert portion exerts said outward force upon said expandable portion body portion in said chamber reduced portion.

12. Pipe stopper apparatus as set forth in claim 1 in which,
- said insert portion is operable to exert a downward axial force upon said expandable portion as said insert portion moves into said expandable portion chamber, and
- said insert portion upon movement through said constricted opening into said chamber reduced portion distorts said expandable portion body portion outwardly and the combined downward axial force and outward force acting upon said expandable portion deforms said expandable portion to sealingly engage the pipeline.

13. A method of sectionalizing a pipeline and blocking fluid flow in the pipeline comprising the steps of,
- positioning an expandable plug in a fitting secured to the pipeline in surrounding relation with a cut-out portion of the pipeline,
- positioning a plug insert within an enlarged chamber portion of the expandable plug having a reduced chamber portion communicating with the enlarged chamber portion through a constricted opening,
- supporting a plug guide for nonrotational axial movement in the fitting,
- connecting the plug guide to the plug insert and in contact with the expandable plug,
- axially moving the plug guide in the fitting to advance the expandable plug through the cut-out portion into abutting relation with the bottom of the pipeline,
- applying a force upon the expandable plug by downward movement of the plug guide to advance the plug insert in the expandable plug from the enlarged chamber portion through the constricted opening and into the reduced chamber portion, and
- applying an outward force upon the expandable portion by movement of the plug insert in the constricted opening and into the chamber reduced portion to outwardly expand the expandable plug into sealing engagement with the interior walls of the pipeline and thereby block fluid flow therethrough.

14. A method of sectionalizing a pipeline and blocking fluid flow in the pipeline as set forth in claim 13 which includes,
- rotatably supporting a stem in the fitting,
- preventing rotation of the plug guide in the fitting,
- connecting the stem to the plug guide for rotation of the stem relative to the plug guide, and
- rotating the stem to nonrotatably axially advance the plug guide to position the expandable plug in the pipeline for expansion.

15. A method of sectionalizing a pipeline and blocking fluid flow in the pipeline as set forth in claim 13 which includes,
- advancing the plug guide together with the plug insert and the expandable plug downwardly in the fitting to position the expandable plug in abutting relation with the bottom of the pipeline, and
- thereafter advancing the plug guide downwardly to move the plug insert in the expandable plug from the chamber enlarged portion through the constricted opening into the chamber reduced portion to expand the expandable plug outwardly into sealing relation with the interior of the pipeline while maintaining the expandable plug axially fixed in the pipeline.

16. A method of sectionalizing a pipeline and blocking fluid flow in the pipeline as set forth in claim 13 which includes,
- reinforcing the expanded plug by the plug insert to prevent separation of the expanded plug from sealing engagement with the interior walls of the pipeline.

17. A method of sectionalizing a pipeline and blocking fluid flow in the pipeline as set forth in claim 13 which includes,
- advancing the plug guide downwardly in the fitting to move the plug insert from the chamber enlarged portion through the constricted opening and into the chamber reduced portion,
- continuing to advance the plug insert in the constricted opening and in the chamber reduced portion to exert a downward force by the plug guide on the expandable plug and an outward radial force by the plug insert on the expandable plug, and
- restraining further downward movement of the plug guide in the fitting to limit the force applied by the plug guide to the expandable plug.

18. A method of sectionalizing a pipeline and blocking fluid flow in the pipeline as set forth in claim 13 which includes,
- connecting the plug guide to a stem for rotation of the stem relative to the plug guide,
- supporting the stem for fixed rotational mmovement in the fitting,
- engaging the plug guide to the expandable plug and the plug insert, and
- rotating the stem to nonrotatably axially advance the plug guide togetherl with the expandable plug and the plug insert in the fitting to position the expandable plug in abutting relation with the bottom of the pipeline.

19. A method of sectionalizing a pipeline and blocking fluid flow in the pipeline as set forth in claim 18 which includes,
- rotating the stem to force the plug guide against the expandable plug and advance the plug insert into the chamber reduced portion to expand the expandable plug outwardly into sealing engagement with the interior walls of the pipeline, and
- restraining axial movement of the plug guide after the plug insert has moved into the chamber reduced portion and the plug has expanded.

20. A method of sectionalizing a pipeline and blocking fluid flow in the pipeline as set forth in claim 13 which includes,
- simultaneously applying a downward force upon the expandable plug by the plug guide and an outward force upon the expandable plug by the plug insert to expand the expandable plug into sealing engagement with the interior walls of the pipeline.

* * * * *